(12) United States Patent
Dedeloudis et al.

(10) Patent No.: US 12,195,398 B2
(45) Date of Patent: Jan. 14, 2025

(54) PRODUCT COMPRISING CEMENT AND SUPPLEMENTARY CEMENTITIOUS MATERIAL, AND METHODS OF MAKING

(71) Applicant: IMERTECH SAS, Paris (FR)

(72) Inventors: Christos Dedeloudis, Athens (GR); Dionysios Kotinis, Jeddah (SA); Bassam Salem, Jeddah (SA); Christina Kapralou, Nea Makri (GR)

(73) Assignee: Imertech SAS, Paris (FR)

( * ) Notice: Subject to any disclaimer, the term of this patent is extended or adjusted under 35 U.S.C. 154(b) by 557 days.

(21) Appl. No.: 17/425,352

(22) PCT Filed: Jan. 23, 2020

(86) PCT No.: PCT/EP2020/051651
§ 371 (c)(1),
(2) Date: Jul. 23, 2021

(87) PCT Pub. No.: WO2020/152279
PCT Pub. Date: Jul. 30, 2020

(65) Prior Publication Data
US 2022/0098104 A1  Mar. 31, 2022

(30) Foreign Application Priority Data
Jan. 24, 2019 (EP) .................................. 19386006

(51) Int. Cl.
*C04B 28/04* (2006.01)
*C04B 111/21* (2006.01)

(52) U.S. Cl.
CPC ............ *C04B 28/04* (2013.01); *C04B 2111/21* (2013.01)

(58) Field of Classification Search
CPC ....... C04B 28/04; C04B 2111/21; C04B 7/13; C04B 14/10; C04B 14/18; C04B 20/008
See application file for complete search history.

(56) References Cited

U.S. PATENT DOCUMENTS

| 9,822,037 B1 * | 11/2017 | Ciuperca | .................. C04B 14/14 |
| 2012/0012034 A1 | 1/2012 | Guynn | |
| 2018/0339943 A1 | 11/2018 | Ciupercu | |

FOREIGN PATENT DOCUMENTS

| CN | 102503229 A | * | 6/2012 | ............. C04B 24/28 |
| CN | 104945997 A | * | 9/2015 | ............... C09D 5/34 |
| CN | 107513282 A | * | 12/2017 | ............... C08L 97/02 |
| CN | 108439872 A | * | 8/2018 | ............. C04B 28/00 |
| JP | 1-320244 A | * | 12/1989 | ............. C04B 28/02 |

OTHER PUBLICATIONS

Frank Etzler: "Particle Size Analysis: a Comparative Study of Various Methods", Part. Part. Syst . Charact., Jan. 1, 1995 (Jan. 1, 1995), pp. 217-224, XP855885762, DOI: 18.1882/ppsc.19958120583 Retrieved from the Internet: URL:http://onlinelibrary.wiley.corn/store/18.1882/ppsc.19958128503/asset/19958120583ftp. pdf? v=III t=gryi Ss4t8s=a1828a46b830a46279acda83cc453f1439127edf [retrieved on 2811-88-38] the whole document.

Kupwade-Patil Kunal et al: "Hydration kinetics and morphology of cement pastes with pozzolanic volcanic ash studied via synchrotron-based techniques", Journal of Materials Science, Kluwer Academic Publishers, Dordrecht, vol. 53, No. 3, Oct. 13, 2817 (2817-18-13), pp. 1743-1757, XP836362222, ISSN: 8822-2461, DOI: 18.1887/S18853-817-1659-4 [retrieved on 2817-18-13] "Materials", "Methods", "Conclusions"; tables 1-4.

Shanahan Natallia et al: "Heat of hydration prediction for blended cements", Journal of Thermal Analysis and Calorimetry, Kluwer, Dordrecht, NL, vol. 128, No. 3, Dec. 29, 2816 (2816-12-29), pp. 1279-1291, XP836234189, ISSN: 1388-6158, DOI: 18.1887/S18973-816-6059-5 [retrieved on 2816-12-29] "Materials", "Methods", "Experimental", "Factorial design", "Conclusions"; tables 1-4,7.

International Search Report and Written Opinion mailed Mar. 25, 2020, in International Application No. PCT/EP2020/051651.

* cited by examiner

Primary Examiner — Anthony J Green
(74) Attorney, Agent, or Firm — Finnegan, Henderson, Farabow, Garrett & Dunner, LLP

(57) ABSTRACT

A cement product including a supplementary cementitious material (SCM) including natural aluminosilicate, and optionally metakaolin, and methods of producing the cement product, and methods of use thereof are provided. The natural aluminosilicate may have, for example, a d97 less than or equal to about 19 μm; and may have a d10 less than or equal to about 2 μm. The product may also have improved chloride permeability as compared to cement products including natural aluminosilicates having higher d97 and d10 values. Also, the product may also have improved compressive strength and RCPT values when a portion of the natural aluminosilicate in the SCM is replaced with metakaolin.

12 Claims, No Drawings

PRODUCT COMPRISING CEMENT AND SUPPLEMENTARY CEMENTITIOUS MATERIAL, AND METHODS OF MAKING

CLAIM FOR PRIORITY

This application is a U.S. national phase entry under 35 U.S.C. § 371 from PCT International Application No. PCT/EP2019/051651, filed Jan. 23, 2020 which claims the benefit of priority of European Patent Application No. 19386006.1 filed Jan. 24, 2019, from both of which this application claims priority and both of which are incorporated herein by reference.

FIELD OF THE DISCLOSURE

This disclosure relates to a product comprising cement and a supplementary cementitious material, such as for example a natural aluminosilicate, and optionally a metakaolin.

BACKGROUND OF THE DISCLOSURE

Supplementary cementitious materials (SCM) are added to cement for enhancement of various structural, processing, and application properties. Aluminosilicates and metakaolin are well known SCMs having pozzolanic attributes. Bustos et al., discloses use of natural pozzolans (NP) to improve concrete durability, results show that NP reduced chloride ion diffusion by 66%. Journal of Civil Engineering and Management, Volume 21, 2015—Issue 2 discloses reducing concrete permeability by using natural pozzolans and reduced aggregate-to-paste ratio. In Design and Control of Concrete Mixtures EB001, Chapter 3, the use of natural pozzolans (calcined metakaolin, calcined clay, calcined shale) are disclosed to reduce permeability. In Merida, Measure of the Chloride Permeability of the Pozzolana Concrete in Sulphate Middle, Procedia—Social and Behavioral Sciences 195 (2015) 2668-2674, it is disclosed that natural pozzolan of volcanic origin reduces chloride penetration. US20120192767 and US20160289121, disclose use of processed mineral additive in combination with metakaolin for reducing concrete permeability and increasing strength. The following patent references variously disclose that unexpanded perlite can also be combined with metakaolin, but without reference to permeability durability e.t.c.; Halliburton, U.S. Pat. No. 8,403,045B2, U.S. Ser. Nos. 12/975,196, 13/606,120, 13/606,098, 13/669,149, US20110100626. Also at www.hesspozz.com, high performance pozzolan "UltraPozz" Pumice 3µ is disclosed as a key component in concrete with high strength and low permeability.

The need for SCM with pozzolanic efficiency is well established in the market. Increased pozzolanic activity results in the improvement of strength in concretes significantly over time as well as the increase of its durability. Durability represents the service life of the concrete and is related to its permeability, since, some types of attacks on concrete structures, such as alkali-silica reaction (ASR), carbonation, water leaching, sulfate attack, and corrosion of reinforcement are governed by the permeability of the matrix. Improved permeability results in lowering chloride penetration or reducing sulfur or sulfate attack.

Currently the specification in chloride permeability for buildings is below 1500 Coulombs in 28 days of accelerated curing of concrete or below 1000 Coulombs in 56 days of aging, as described in ASTM C1202. These values are achieved in practice only by using silica fume as pozzolanic additive. Current solutions do not provide SCMs which provide sufficiently high compressive strength along with low chloride ion penetration as measured using the rapid chloride permeability test (RCPT, according to ASTM C1202); such as values for the cured product after 28 days of accelerated curing of less than or equal to about 1500 coulombs. The proposed solution is commercially significant because it comprises an SCM material(s) with low cost (due to the aluminosilicate) and high efficiency (due to metakaolin). Also the possibility to control the pozzolanicity of the product is of high commercial interest in the field.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a product comprising a cement and a supplementary cementitious material comprising a natural aluminosilicate, wherein the natural aluminosilicate has a d97 less than or equal to about 19 µm or less than or equal to about 18 µm or less than or equal to about 15 µm or less than or equal to about 12 µm; and has a d10 less than or equal to about 2 µm or less than or equal to about 1.5 µm or less than or equal to about 1 µm.

In another aspect of the disclosure, the natural aluminosilicate is selected from perlite, diatomaceous earth, pumice and combinations thereof, and wherein the natural aluminosilicate contains compounds comprising silica and alumina present in an aluminosilicate matrix; and wherein greater than or equal to about 75 or greater than or equal to about 80 or greater than or equal to about 85 wt % of the aluminosilicate matrix is in an amorphous state.

In another aspect of the disclosure, the supplementary cementitious material further comprises metakaolin having a d50 less than or equal to 5.5 µm, or less than or equal to 5.0 µm, or less than or equal to 4.0 µm or less than or equal to 3.0 microns; and a d50 greater than or equal to about 0.1 µm or greater than or equal to about 0.2 µm or greater than or equal to about 0.5 µm or greater than or equal to about 0.7 µm or greater than or equal to about 1 micron.

Another aspect of the disclosure relates to a method of producing a cement-containing product by admixing a supplementary cementitious material comprising a natural aluminosilicate with a cement and water to form an intermediate mixture and allowing the intermediate mixture to cure forming the cured cement-containing product; wherein the natural aluminosilicate has a d97 less than or equal to about 19 µm or less than or equal to about 18 µm or less than or equal to about 15 µm or less than or equal to about 12 µm; and has a d10 less than or equal to about 2 µm or less than or equal to about 1.5 µm or less than or equal to about 1 µm; wherein the natural aluminosilicate has a d97 greater than or equal to about 2 µm or greater than or equal to about 5 µm or greater than or equal to about 6 µm or greater than or equal to about 7 µm or greater than or equal to about 8 µm or greater than or equal to about 10 µm; and has a d10 greater than or equal to about 0.1 µm or greater than or equal to about 0.5 µm or greater than or equal to about 1 µm. The cement-containing product can also comprise other additives including aggregates (rock, sand, or gravel), plastisizers, corrosion inhibitors, and functional additives.

In another aspect of the disclosure, the supplementary cementitious material used in the method of forming the cement product further comprises metakaolin having a d50 less than or equal to 5.5 µm, or less than or equal to 5.0 µm, or less than or equal to 4.0 µm or less than or equal to 3.0 microns; and a d50 greater than or equal to about 0.1 µm or greater than or equal to about 0.2 µm or greater than or equal to about 0.5 µm or greater than or equal to about 0.7 µm or greater than or equal to about 1 micron.

Additional objects and advantages of the disclosed embodiments will be set forth in part in the description which follows, and in part will be obvious from the description, or may be learned by practice of those embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive.

DETAILED DESCRIPTION

Particular aspects of the present disclosure are described in greater detail below. The terms and definitions provided herein control, if in conflict with terms and/or definitions incorporated by reference.

In the Summary above and in the Detailed Description, and the claims below, reference is made to particular features (including method steps) of the disclosure. It is understood that the present disclosure includes all possible combinations of such particular features. For example; where a particular feature is disclosed in the context of a particular aspect or embodiment, or a particular claim, that feature can also be used, to the extent possible in combination with and additionally or alternatively in the context of other particular aspects or embodiments of the disclosure and, in the disclosure generally.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, the singular forms "a," "an," and "the" include plural reference unless the context dictates otherwise. The terms "approximately" and "about" refer to being nearly the same as a referenced number or value. As used herein, the terms "approximately" and "about" should be understood to encompass ±5% of a specified amount or value.

When a range is used herein as "ranging from (a first number)" to (a second number)," "between (a first number) and (a second number)," or "(a first number)-(a second number)," this refers to a range whose lower limit is the first number, and whose upper limit is the second number. As used herein, the term "at least" followed by a number denotes the start of a range beginning with that number, which may be a range having an upper limit or no upper limit depending on the variable term being defined. For example, "at least 1" includes 1 and more than 1.

Particle Size Distribution (PSD)

The particle size of powder is defined by laser diffraction. A parallel laser beam passes through a dispersed particulate sample suspended in air or water or other polar solvent or organic solvent and the angular variation in intensity of the scattered light is measured. Small particles scatter light at large angles relative to the initial laser beam and large particles scatter light at smaller angles. The angular scattering intensity data is then analyzed using Fraunhofer light scattering theory or Mie theory to calculate the size of the particles. Preferably, the particle size is measured with a CILAS 1090 instrument. Preferably, the particle size is measured in water and calculated according to the Mie model. Preferably, the particle size is measured in water, with the use of ultrasound and calculated according to the Mie model. The term d97 is defined such that 97 percent (by volume) of the particle population has a size or particle spherical diameter below the d97 value. The term d90 is defined such that 90 percent (by volume) of the particle population has a size or particle spherical diameter below the d90 value. The term d10 is defined such that 10 percent (by volume) of the particle population has a size or particle spherical diameter below the d10 value. The median particle size is defined by the value d50, wherein 50 percent (by volume) of the particle population has a size below the d50 value. d50 is the median average spherical diameter of the particles.

The present disclosure includes products containing cement and processes for making. The products comprise, consist of, or consist essentially of: a cement and a supplementary cementitious material comprising a natural aluminosilicate, wherein the natural aluminosilicate has a d97 less than or equal to about 19 µm or less than or equal to about 18 µm or less than or equal to about 15 µm or less than or equal to about 12 µm; and has a d10 less than or equal to about 2 µm or less than or equal to about 1.5 µm or less than or equal to about 1 µm.

In accordance with an embodiment, the natural aluminosilicate is selected from perlite, diatomaceous earth, pumice and combinations thereof. In accordance with this and the other embodiments, the natural aluminosilicate contains compounds comprising silica and alumina present in an aluminosilicate matrix. In addition, greater than or equal to about 75 or greater than or equal to about 80 or greater than or equal to about 85 wt % of the aluminosilicate matrix is in an amorphous state.

In accordance with an embodiment, the weight ratio of silica to alumina of the natural aluminosilicate is less than or equal to about 7 or less than or equal to about 6 or less than or equal to about 5 or less than or equal to about 4.5 or less than or equal to about 4. In addition, a lower alumina to silica ratio generally increases cement product durability such as increasing compressive strength and lowering chloride permeability, as further discussed below.

In accordance with an embodiment, the natural aluminosilicate has a d50 less than or equal to about 6.5 µm or less than or equal to about 6.2 µm or less than or equal to about 6.0 µm or less than or equal to about 5.8 µm or less than or equal to about 5 µm or less than or equal to about 4.5 microns; and has a d90 less than or equal to about 17 µm or less than or equal to about 15 µm or less than or equal to about 10 µm or less than or equal to about 9.5 µm or less than or equal to about 9 µm.

In accordance with an embodiment, the natural aluminosilicate has a d97 greater than or equal to about 2 µm or greater than or equal to about 5 µm or greater than or equal to about 6 µm or greater than or equal to about 7 µm or greater than or equal to about 8 µm or greater than or equal to about 10 µm; and has a d10 greater than or equal to about 0.1 µm or greater than or equal to about 0.5 µm or greater than or equal to about 1 µm.

In accordance with an embodiment, the natural aluminosilicate has a d50 greater than or equal to about 0.5 μm or greater than or equal to about 1 μm or greater than or equal to about 2 μm or greater than or equal to about 3 μm; and has a d90 greater than or equal to about 1 μm or greater than or equal to about 2 μm or greater than or equal to about 3 μm or greater than or equal to about 4 μm or greater than or equal to about 5 μm.

In accordance with an embodiment, the supplementary cementitious material can be present in the product in any amount sufficient to provide desired pozzolanicity to the product, and more particularly is present in the product in an amount of at least about 5 wt % or at least about 7 wt % or at least about 10 wt % or at least about 15 wt % or at least about 20 wt %, based on the total weight of the product. In addition, the supplementary cementitious material is present in the product in an amount equal to or lower than about 35 wt % or equal to or lower than about 27 wt % or equal to or lower than about 25 wt %, based on the total weight of the product.

In accordance with an embodiment, the supplementary cementitious material further comprises metakaolin having a d50 less than or equal to 5.5 μm or less than or equal to 5.0 μm, or less than or equal to 4.0 μm or less than or equal to 3.0 microns; and a d50 greater than or equal to about 0.1 μm or greater than or equal to about 0.2 μm or greater than or equal to about 0.5 μm or greater than or equal to about 0.7 μm or greater than or equal to about 1 micron.

In accordance with an embodiment, the natural aluminosilicate is present in the supplementary cementitious material in an amount of at least about 50 wt % or at least about 55 wt % or at least about 60 wt % or at least about 65 wt % or at least about 70 wt % or at least about 75 wt % or at least about 80 wt % or at least about 85 wt % or at least about 90 wt % or at least about 95 wt %; and the metakaolin is present in the supplementary cementitious material in an amount of less than or equal to about 50 wt % or less than or equal to about 45 wt % or less than or equal to about 40 wt % or less than or equal to about 35 wt % or less than or equal to about 30 wt % or less than or equal to about 25 wt % or less than or equal to about 20 wt % or less than or equal to about 15 wt % or less than or equal to about 10 wt % or less than or equal to about 5 wt % or 0 wt %; based on the total weight of the supplementary cementitious material. For this and all other embodiments herein, the ratio and relative amounts of the natural aluminosilicate to metakaolin is not limited and depends on the desired pozzolanic efficiency and cost.

In accordance with an embodiment, the natural aluminosilicate is present in the supplementary cementitious material in an amount equal to 100 wt % or equal to or lower than about 97 wt % or equal to or lower than about 95 wt % or equal to or lower than about 90 wt %; and the metakaolin is present in the supplementary cementitious material in an amount of at least about 1 wt % or at least about 3 wt % or at least about 5 wt % or at least about 10 wt %; based on the total weight of the supplementary cementitious material.

In accordance with an embodiment, a method of producing a cured cement-containing product comprises admixing a supplementary cementitious material comprising a natural aluminosilicate with a cement and water to form an intermediate mixture. The cement-containing product can also comprise other additives including aggregates (rock, sand, or gravel), plasticizers, corrosion inhibitors, and functional additives. In addition, the intermediate mixture is allowed to cure forming the cured cement-containing product; wherein the natural aluminosilicate has a d97 less than or equal to about 19 μm or less than or equal to about 18 μm or less than or equal to about 15 μm or less than or equal to about 12 μm; and has a d10 less than or equal to about 2 μm or less than or equal to about 1.5 μm or less than or equal to about 1 μm; wherein the natural aluminosilicate has a d97 greater than or equal to about 2 μm or greater than or equal to about 5 μm or greater than or equal to about 6 μm or greater than or equal to about 7 μm or greater than or equal to about 8 μm or greater than or equal to about 10 μm; and has a d10 greater than or equal to about 0.1 μm or greater than or equal to about 0.5 μm or greater than or equal to about 1 μm.

In accordance with an embodiment, the natural aluminosilicate has a d50 less than or equal to about 6.5 μm or less than or equal to about 6.2 μm or less than or equal to about 6 μm or less than or equal to about 5.8 μm or less than or equal to about 5 μm or less than or equal to about 4.5 microns; and has a d90 less than or equal to about 17 μm or less than or equal to about 15 μm or less than or equal to about 10 μm or less than or equal to about 9.5 μm or less than or equal to about 9 microns; wherein the natural aluminosilicate has a d50 greater than or equal to about 0.5 μm or greater than or equal to about 1 μm or greater than or equal to about 2 μm or greater than or equal to about 3 μm; and has a d90 greater than or equal to about 1 μm or greater than or equal to about 2 μm or greater than or equal to about 3 μm or greater than or equal to about 4 μm or greater than or equal to about 5 μm.

In accordance with an embodiment, the supplementary cementitious material further comprises metakaolin having a d50 less than or equal to 5.5 μm, or less than or equal to 5.0 μm, or less than or equal to 4.0 μm or less than or equal to 3.0 microns; and a d50 greater than or equal to about 0.1 μm or greater than or equal to about 0.2 μm or greater than or equal to about 0.5 μm or greater than or equal to about 0.7 μm or greater than or equal to about 1 micron.

In accordance with an embodiment, the chloride permeability of the cured product after after 28 days of accelerated curing as described in ASTM C1202 is less than or equal to about 800 coulombs or less than or equal to about 700 coulombs or less than or equal to about 600 coulombs, as measured according to ASTM C1202.

In accordance with an embodiment, the chloride permeability of the cured product after 56 days of aging is less than or equal to about 1100 coulombs or less than or equal to about 1000 coulombs or less than or equal to about 900 coulombs or less than or equal to about 800 coulombs or less than or equal to about 700 coulombs, as measured according to ASTM C1202.

In accordance with an embodiment, the cured cement-containing product has a compressive strength of at least 80% or at least 90% or at least 95% or at least 98% of the compressive strength of a comparative cured product not including the natural aluminosilicate, as measured according to ASTM C39 measured using cylindrical specimens.

In accordance with an embodiment, the supplementary cementitious material is present in the cured product in an amount of at least about 5 wt % or at least about 7 wt % or at least about 10 wt % or at least about 15 wt % or at least about 20 wt %, and in an amount equal to or lower than about 35 wt % or equal to or lower than about 27 wt % or equal to or lower than about 25 wt %, based on the total weight of the cured cement-containing product.

In accordance with an embodiment, the intermediate mixture further comprises an aggregate.

Natural Aluminosilicate

The term "natural aluminosilicate" is used in the conventional sense and can refer to natural glass, which are commonly referred to as "volcanic glasses," which may be formed by the rapid cooling of siliceous magma or lava. Most natural glasses are chemically equivalent to rhyolite. Natural glasses which are chemically equivalent to trachyte, dacite, andesite, latite, shirasu, and basalt are known but are less common. The term "obsidian" is generally applied to dark, most often black, massive natural glasses that are rich in silica (i.e., $SiO_2$). Obsidian glasses may be classified into subcategories according to their silica content, with rhyolitic obsidians (containing typically about 73% $SiO_2$ by weight) as the most common. Perlite is another common natural glass.

Perlite is a hydrated natural glass containing typically about 72-75% $SiO_2$, 12-14% $Al_2O_3$, 0.5-2% $Fe_2O_3$, 2-5% $Na_2O$, 3-5% $K_2O$, 0.4-1.5% CaO (by weight), and small concentrations of other metallic elements. Perlite is distinguished from other natural glasses by a higher content (e.g., 2-10% by weight) of chemically-bonded water, the presence of a vitreous, pearly luster, and characteristic concentric or arcuate onion skin-like (i.e., "perlitic") fractures, though other petrographic structures have also been noticed (i.e. sugar like or Pumice like).

A. Exemplary Methods for Preparing Examples of Natural Aluminosilicates

As described above, embodiments of the natural aluminosilicates may have a defined particle size and other unique physical properties. The natural aluminosilicates can be prepared by several methods.

In one embodiment, a top size-controlled natural aluminosilicate may be produced by classifying a natural aluminosilicate material on commercially available air classifiers. For example, pilot scale classifiers micron separator classifiers may be used for the classification of perlite ore feed material. These classifiers mainly consist of a horizontally or vertically mounted high speed classifying wheels and a classifying air outlet. The classifying air injected into the machine base flows inwards through the classifying wheel and discharges the fine material, whereas the coarse particles rejected by the classifying wheel leave the classifier through the coarse material outlet.

Other possible methods of preparing examples of the natural aluminosilicates may include milling a natural aluminosilicate feed in conjunction with classification. Examples of mills include a ball mill, a stirred media mill, a jet mill, and a fixed gap mill, such as a roller mill. Wet classification techniques can also be used, such as, for example, sedimentation, which separates suspended solid particles from a liquid by gravity settling, and hydrocycloning, which uses centrifugal action to classify particles in a liquid media.

EXAMPLES

Examples of cement products including supplementary cementitious materials and exemplary methods for their preparation are described in the following examples, which are offered by way of illustration and not by way of limitation.

Particle size data for these examples were collected using a laser particle size analyzer.

Concrete testing was conducted using various natural aluminosilicate materials, with some specimens also including metakaolin.

Raw perlite having a d50 of 25 μm was milled in an industrial mill to form a natural aluminosilicate with a d50 of 6.08 μm and a d90 of 14.7 μm (Natural Aluminosilicate A). Portions of the same raw perlite was milled in the industrial mill to form a natural aluminosilicate with a d50 of 4.2 μm and a d90 of 11.9 μm (Natural Aluminosilicate B). Metakaolin was crushed and milled in a lab scale ball mill to a d50 of 3.7 μm. These Natural Aluminosilicates A and B and the metakaolin were used as at least portions of supplemental cementitious materials (SCM) added to cement in the preparation of the concrete specimens, as described below.

Concrete specimens of 0.05 $m^3$ volume were prepared using ordinary Portland cement (OPC), aggregates of various sizes and a superplastisizer. The water to cementitious materials (including cement and any SCM added to the cement) ratio was kept constant of 0.38 to 0.39 while the level of cement replacement from SCM varied from 0 to 12.1% by weight.

Example 1

The concrete recipes for all concrete specimens in Example 1 are shown in Table 1. The concrete specimens were examined by one or more of the following tests: compressive strength (ASTM C39 measured using cylindrical specimens); strength activity index (ASTM 1240); and Ability to Resist Chloride Ion Penetration (RCPT) according to ASTM C1202. Results are also shown in Table 1.

TABLE 1

Concrete recipes and Results

| | Concrete Specimen | | | | | | |
|---|---|---|---|---|---|---|---|
| | A Kg | B Kg | C Kg | D Kg | E Kg | F Kg | G Kg |
| OPC | 380.4 | 368 | 388.5 | 380.4 | 410 | 410 | 410 |
| SCM Components | | | | | | | |
| Natural Aluminosilicate A d50 = 6.08 μm d97 = 14.7 μm | 37.6 | 50 | — | — | 40 | 36 | 34 |
| Natural Aluminosilicate B d50 = 4.2 μm d97 = 11.9 μm | — | — | 29.5 | 37.6 | — | — | — |
| Metakaolin | — | — | — | — | — | 4 | 6 |
| Total SCM | 37.6 | 50 | 29.5 | 37.6 | 40 | 40 | 40 |
| SCM % replacement | 9.9 | 13.6 | 7.6 | 9.9 | 9.8 | 9.8 | 9.8 |
| Aggregates ¾' | 570 | 570 | 570 | 570 | 324 | 324 | 324 |

TABLE 1-continued

Concrete recipes and Results

| | Concrete Specimen | | | | | | |
|---|---|---|---|---|---|---|---|
| | A Kg | B Kg | C Kg | D Kg | E Kg | F Kg | G Kg |
| Aggregates ½' | 285 | 285 | 285 | 285 | 324 | 324 | 324 |
| Aggregates ⅜' | 285 | 285 | 285 | 285 | 431 | 431 | 431 |
| Agreggates Fine | 707.4 | 703.5 | 710 | 707.4 | 720 | 720 | 720 |
| Superplasticiser | 5 | 5 | 5 | 5 | 5.7-6.0 | 5.7-6.0 | 5.7-6.0 |
| Water | 157 | 157 | 157 | 157 | 170.5 | 170.5 | 170.5 |
| water/cement, wt ratio | 0.39 | 0.39 | 0.39 | 0.39 | 0.38 | 0.38 | 0.38 |
| RESULTS | | | | | | | |
| Activity index 7 days (%) | | | | | 91 | 103 | 105 |
| Compressive strength, 7 days (MPa) | 41.25 | 39.6 | 42.7 | 39.8 | 39.85 | 42.05 | 42.55 |
| Compressive strength, 28 days (MPa) | | | 47.9 | | 48.85 | 50.2 | 49.2 |
| RCPT 28 days (Coulombs) | 1518 | 1155 | 1190 | 1042 | 1712 | 1400 | 1597 |
| RCPT 56 days (Coulombs) | 1075 | 824 | 928 | 659 | 1486 | 1078 | 1316 |

From the RCPT results presented in Table 1 it is evident that controlling of natural aluminosilicate size and increasing SCM (pozzolan) addition can significantly improve the RCPT of concrete to values that meet the specifications (below 1500 Coulombs in 28 days and below 1000 Coulombs in 56 days).

The milling of the raw perlite at d50<5 μm and d90<10 μm (Natural Aluminosilicate B in Concrete Specimen D) as compared to the Natural Aluminosilicate A used in Concrete Specimen A results in the reduction of RCPT by about 31% and about 39% for 28 and 56 days respectively.

The increase of cement replacement from 9.9% (Concrete Specimen A) to 13.6% (Concrete Specimen B) increases the 28 and 56 day RCPT values by approximately 23% for Natural Aluminosilicate A, while for Natural Aluminosilicate B when the cement replacement is increased from 7.6% (Concrete Specimen C) to 9.9% (Concrete Speciment D) the RCPT is improved by up to 29% in 56 days.

The replacement of natural aluminosilicate A in the SCM with 10 wt % or 15 wt % of metakaolin, based on the total weight of the SCM, results in an increase of strength activity index from 91% to 103% and 105%, respectively. A small increase in compressive strength is also achieved with the replacement of the natural aluminosilicate A with metakaolin in the 7 and 28 day compressive strength values. Also, as compared to Concrete Specimen E, the 28 day and 56 day RCPT values for Concrete Specimen F (containing 10% metakaolin) is reduced by about 18% and about 27.5%, respectively. Also, as compared to Concrete Specimen E, the 28 day and 56 day RCPT values for Concrete Specimen G (containing 15% metakaolin) is reduced by about 6.7% and about 11.4%, respectively.

Example 2

The concrete recipes for all concrete specimens for Example 2 are shown in Table 2. The concrete specimens were examined by one or more of the following tests: compressive strength (ASTM C39 measured using cylindrical specimens); strength activity index (ASTM 1240); and Ability to Resist Chloride Ion Penetration (RCPT) according to ASTM C1202. The 28 day testing was performed in two ways: i) 28 days of normal curing (NC); and ii) 28 days of accelerated curing including 7 days of normal curing and 21 days of curing at 38 C (AC). Results are also shown in Table 2.

TABLE 2

Concrete recipes and Results

| | Concrete Specimen | | | | | |
|---|---|---|---|---|---|---|
| | H Kg | I Kg | J Kg | K Kg | L Kg | M |
| OPC | 380.0 | 298.0 | 334.0 | 352.0 | 343.0 | 343.0 |
| SCM - Natural Aluminosilicate A d50 = 6.08 μm d97 = 14.7 μm | 38.0 | 52.0 | 46.0 | 48.0 | 47.0 | 47.0 |
| SCM % replacement | 9.1 | 14.9 | 12.1 | 12.0 | 12.1 | 12.1 |
| Aggregates ¾' | 578.3 | 249.6 | 280.6 | 280.6 | 579.0 | 579.0 |
| Aggregates ½' | 289.1 | 374.3 | 288.4 | 288.4 | 289.5 | 289.5 |
| Aggregates ⅜' | 289.1 | 390.8 | 336.0 | 336.0 | 289.0 | 289.0 |

TABLE 2-continued

Concrete recipes and Results

| | Concrete Specimen | | | | | |
|---|---|---|---|---|---|---|
| | H Kg | I Kg | J Kg | K Kg | L Kg | M |
| Agreggates Fine | 710.8 | 962.3 | 980.2 | 980.2 | 735.0 | 735.0 |
| Water | 171.7 | 150.6 | 155.2 | 162.9 | 156.0 | 156.0 |
| water/cement, wt ratio | 0.38 | | | | 0.38 | 0.38 |
| RESULTS | | | | | | |
| Compressive strength, 7 days (MPa) | — | 36.8 | 42.4 | 22.0 | — | — |
| Compressive strength, 28 days - NC (MPa) | 50.6 | — | 50.3 | 28.2 | 49.4 | 53.25 |
| Compressive strength, 28 days - AC (MPa) | 55.1 | 54.0 | 48.6 | 30.4 | 51.5 | 53.4 |
| RCPT 28 days -NC (Coulombs) | 1626 | — | 1225 | 1163 | 1240 | 1289 |
| RCPT 28 days -AC (Coulombs) | 645 | 649 | 483 | 506 | 518 | 604 |
| RCPT 56 days -NC (Coulombs) | — | — | — | 933 | — | — |

From the RCPT results presented in Table 2 it is evident that the values for the 28 day accelerated curing tests (AC) are significantly lower than those for the 28 day normal curing tests.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A product comprising a cement and a supplementary cementitious material comprising a natural aluminosilicate and a metakaolin, wherein the natural aluminosilicate has a d97 less than or equal to about 19 μm; wherein the metakaolin has a d50 between about 0.1 μm and about 5.5 μm, and wherein the natural aluminosilicate is present in the supplementary cementitious material in an amount of at least about 50 wt %.

2. The product according to claim 1, wherein the natural aluminosilicate is selected from perlite, diatomaceous earth, pumice and combinations thereof,
   the natural aluminosilicate contains compounds comprising silica and alumina present in an aluminosilicate matrix; and
   greater than or equal to about 75 wt % or greater than of the aluminosilicate matrix is in an amorphous state.

3. The product according to claim 1 wherein the weight ratio of silica to alumina of the natural aluminosilicate is less than or equal to about 6.

4. The product according to claim 1 wherein the natural aluminosilicate has a d50 less than or equal to about 6.5 μm and has a d90 less than or equal to about 17 μm.

5. The product according to claim 1, wherein the natural aluminosilicate has a d97 greater than or equal to about 2 μm.

6. The product according to claim 1, wherein the natural aluminosilicate has a d50 greater than or equal to about 0.5 μm.

7. The product according to claim 1, wherein the supplementary cementitious material is present in the product in an amount of at least about 5 wt %, and the supplementary cementitious material is present in the product in an amount equal to or lower than about 35 wt %, based on the total weight of the product.

8. A method of producing a cured cement-containing product by admixing a supplementary cementitious material comprising a natural aluminosilicate and metakaolin with a cement and water to form an intermediate mixture and allowing the intermediate mixture to cure forming the cured cement-containing product;
   wherein the natural aluminosilicate has a d97 less than or equal to about 19 μm;
   wherein the metakaolin has a d50 between about 0.1 μm and about 5.5 μm, and
   wherein the natural aluminosilicate is present in the supplementary cementitious material in an amount of at least about 50 wt %.

9. The method according to claim 8, wherein the chloride permeability of the cured cement-containing product after 28 days of accelerated curing as described in ASTM C1202 is less than or equal to about 800 coulombs, as measured according to ASTM C1202; or
   wherein the chloride permeability of the cured cement-containing product after 56 days of aging is less than or equal to about 1100 coulombs, as measured according to ASTM C1202.

10. The method according to claim 8, wherein the cured cement-containing product has a compressive strength of at least 80% of the compressive strength of a comparative cured product not including the natural aluminosilicate, as measured according to ASTM C39 measured using cylindrical specimens.

11. The method according to claim 8, wherein the supplementary cementitious material is present in the cured product in an amount of at least about 5 wt %, and in an amount equal to or lower than about 35 wt %, based on the total weight of the cured cement-containing product.

12. The method according to claim 8, wherein the intermediate mixture further comprises an aggregate.

* * * * *